(12) United States Patent
Imagawa et al.

(10) Patent No.: US 6,944,344 B2
(45) Date of Patent: Sep. 13, 2005

(54) DOCUMENT SEARCH AND RETRIEVAL APPARATUS, RECORDING MEDIUM AND PROGRAM

(75) Inventors: Taro Imagawa, Osaka (JP); Kenji Kondo, Osaka (JP); Yoshihiko Matsukawa, Nara (JP); Tsuyoshi Mekata, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 681 days.

(21) Appl. No.: 09/875,748

(22) Filed: Jun. 6, 2001

(65) Prior Publication Data

US 2002/0041713 A1 Apr. 11, 2002

(30) Foreign Application Priority Data

Jun. 6, 2000 (JP) .......................................... 2000-168547

(51) Int. Cl.[7] ............................................... G06K 9/72
(52) U.S. Cl. ...................... 382/229; 382/382; 382/209; 382/305; 358/403; 707/6
(58) Field of Search ................................. 382/181, 185, 382/187, 190, 198, 209, 218, 229, 291, 305; 358/403; 704/7; 707/1–6; 715/533

(56) References Cited

U.S. PATENT DOCUMENTS

| | | | | |
|---|---|---|---|---|
| 5,218,673 A | * | 6/1993 | Fujiwara ...................... | 345/536 |
| 5,357,431 A | * | 10/1994 | Nakada et al. ............... | 715/531 |
| 5,640,466 A | * | 6/1997 | Huttenlocher et al. ....... | 382/177 |
| 5,732,260 A | * | 3/1998 | Nomiyama ..................... | 707/5 |
| 6,041,323 A | * | 3/2000 | Kubota ........................... | 707/5 |
| 6,097,841 A | * | 8/2000 | Gunji et al. ................. | 382/229 |
| 6,151,598 A | * | 11/2000 | Shaw et al. ..................... | 707/3 |
| 6,182,062 B1 | * | 1/2001 | Fujisawa et al. ............... | 707/3 |

FOREIGN PATENT DOCUMENTS

| | | |
|---|---|---|
| JP | 08-180064 | 7/1996 |
| JP | 09-016619 | 1/1997 |
| JP | 09-034903 | 2/1997 |
| JP | 10-187751 | 7/1998 |
| JP | 11-143893 | 5/1999 |
| JP | 11-232296 | 8/1999 |

OTHER PUBLICATIONS

Copy of Japanese Office Action dated Sep. 7, 2004 non–English.

Copy of Japanese Office Action dated Dec. 22, 2004 non–English.

* cited by examiner

Primary Examiner—Daniel Mariam
(74) Attorney, Agent, or Firm—Snell & Wilmer L.L.P.

(57) ABSTRACT

A search apparatus searches for a keyword from a character recognition result using an index table. The character recognition result being obtained as a result of character recognition of characters in an original document. The index table includes an index character string; a position of a portion, in the character recognition result, which matches the index character string; and a credibility which is defined for each character included in the index character string and indicates a probability of the character existing in a portion, in the original document, which corresponds to a portion, in the character recognition result, which matches the character. The search apparatus includes a position specifying section for determining whether or not the keyword matches a portion in the character recognition result based on the index character string and the position of the portion in the character recognition result which matches the index character string included in the index table; and when a match is determined, for specifying the position of the portion in the character recognition result which matches the keyword; and a calculation section for calculating a keyword credibility which indicates a probability of the keyword existing at a position, in the original document, which corresponds to the position of the portion in the character recognition result which matches the keyword, based on the credibility included in the index table.

7 Claims, 13 Drawing Sheets

FIG. 4

| Character position | 1 | 2 | 3 | 4 | 5 | 6 | ... |
|---|---|---|---|---|---|---|---|
| Candidate character (Reliability Rr) | イ(0.95) | ミ(0.7)<br>シ(0.6) | テ(0.8)<br>チ(0.6)<br>ワ(0.3)<br>ク(0.2) | ン(0.8)<br>ツ(0.75)<br>ヅ(0.4)<br>ン(0.2) | ヲ(0.4)<br>ワ(0.35)<br>ウ(0.3)<br>ク(0.2) | ズ(0.8) | ... |

FIG.5B

| Character position "1" | Character position "2" | Character position "3" |
|---|---|---|
| Credibility Cr<br>"イ"　0.9 | Credibility Cr<br>"シ"　0.8<br>"ン"　0.7 | Credibility Cr<br>"テ"　0.85<br>"デ"　0.8<br>"フ"　0.2<br>"ワ"　0.2 |
| Character position "4" | Character position "5" | Character position "6" |
| Credibility Cr<br>"ソ"　0.85<br>"ツ"　0.8<br>"ッ"　0.3<br>"ン"　0.1 | Credibility Cr<br>"タ"　0.35<br>"ウ"　0.3<br>"ワ"　0.2<br>"ク"　0.1 | Credibility Cr<br>"ス"　0.9 |
| ⋮ | ⋮ | ⋮ |

| Index character string | Character position | Credibility Cr set |
|---|---|---|
| イシ | 1 | (0.9, 0.8) |
| イン | 1 | (0.9, 0.7) |
| ⋮ | | |
| クス | 5 | (0.1, 0.9) |
| ⋮ | | |
| シテ | 2 | (0.8, 0.85) |
| ⋮ | | |
| ソタ | 4 | (0.85, 0.35) |
| ⋮ | | |
| タス | 5 | (0.35, 0.9) |
| ⋮ | | |
| ツウ | 4 | (0.8, 0.3) |
| ック | 4 | (0.3, 0.1) |
| ⋮ | | |
| テソ | 3 | (0.85, 0.85) |
| デッ | 3 | (0.8, 0.3) |
| デン | 3 | (0.8, 0.1) |
| ⋮ | | |
| フツ | 3 | (0.2, 0.8) |
| フッ | 3 | (0.2, 0.3) |
| ⋮ | | |
| ワッ | 3 | (0.2, 0.3) |
| ⋮ | | |
| ンデ | 2 | (0.7, 0.8) |
| ンワ | 2 | (0.7, 0.2) |
| | 4 | (0.1, 0.2) |
| ⋮ | | |

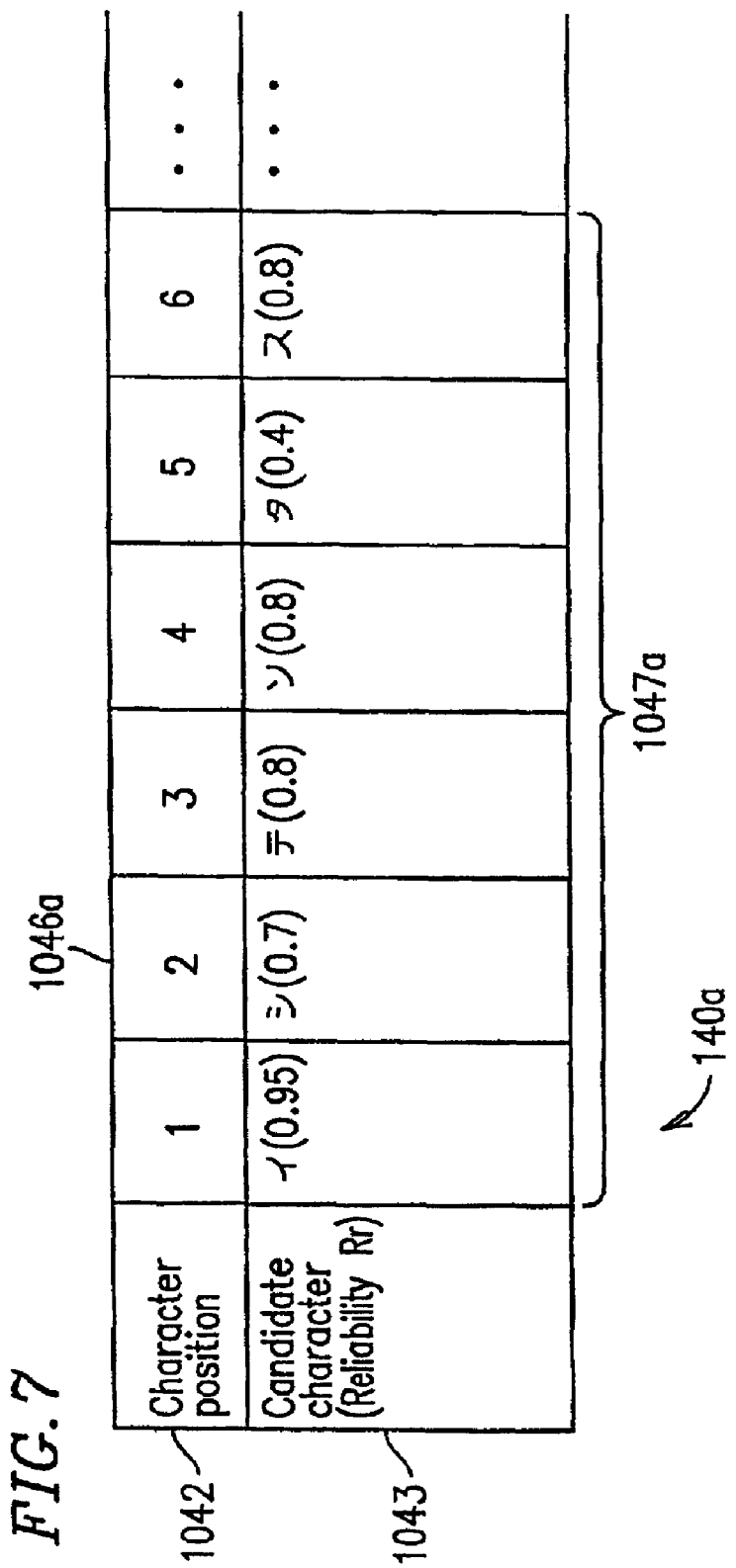

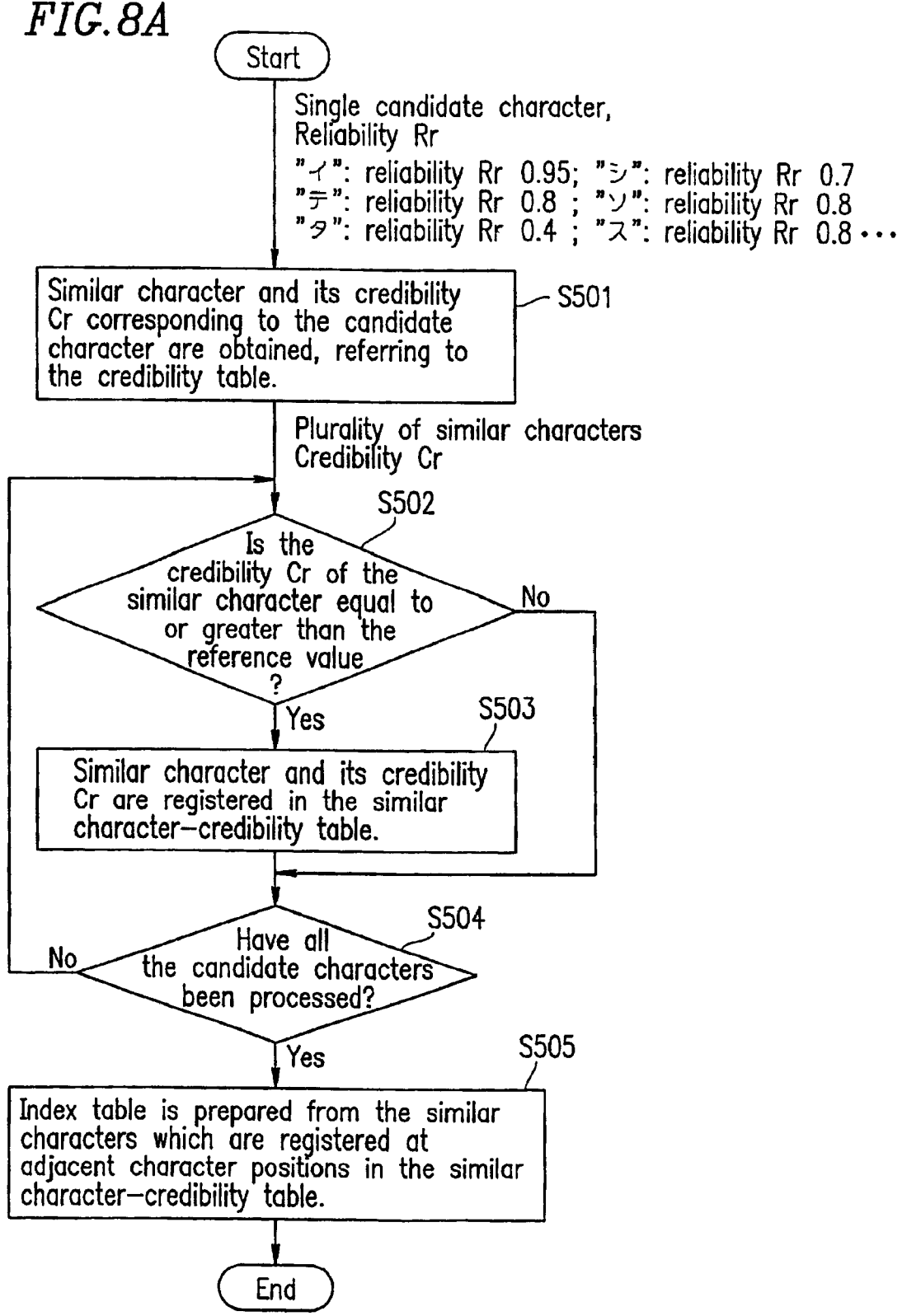

FIG.8B

| Character position "1" | Character position "2" | Character position "3" |
|---|---|---|
| Credibility Cr<br>"イ"　0.9 | Credibility Cr<br>"シ"　0.8<br>"ン"　0.7 | Credibility Cr<br>"テ"　0.85<br>"デ"　0.8<br>"フ"　0.2<br>"ワ"　0.2 |
| Character position "4" | Character position "5" | Character position "6" |
| Credibility Cr<br>"ソ"　0.85<br>"ツ"　0.8<br>"ッ"　0.3<br>"ン"　0.1 | Credibility Cr<br>"タ"　0.35<br>"ウ"　0.3<br>"ワ"　0.2<br>"フ"　0.1 | Credibility Cr<br>"ス"　0.9 |
| ⋮ | ⋮ | ⋮ |

| | | | Similar character | |
|---|---|---|---|---|
| | | | ン | シ |
| | | | Credibility Cr | Credibility Cr |
| Candidate character | ツ | Reliability Rr 0.9 | 0.2 | 0.8 |
| | | 0.7 | 0.7 | 0.8 |
| | | 0.5 | 0.2 | 0.6 |

| | | Character position |
|---|---|---|
| | ・ | |
| | ・ | |
| 1911 — | イシ | 1 |
| 1912 — | イン | 1 |
| | ・ | |
| | ・ | |
| 1913 — | クス | 5 |
| | ・ | |
| | ・ | |
| | シテ | 2 |
| | ・ | |
| | ・ | |
| | ソタ | 4 |
| | ・ | |
| | ・ | |
| | タス | 5 |
| | ・ | |
| | ・ | |
| | ツウ | 4 |
| 1914 — | ック | 4 |
| | ・ | |
| | ・ | |
| | テソ | 3 |
| 1915 — | デッ | 3 |
| 1916 — | デン | 3 |
| | ・ | |
| | ・ | |
| | フツ | 3 |
| 1917 — | フッ | 3 |
| | ・ | |
| | ・ | |
| 1918 — | ワッ | 3 |
| | ・ | |
| | ・ | |
| 1919 — | ンデ | 2 |
| 1920 — | ンワ | 2,4 |
| | ・ | |
| | ・ | |

↘ 1901

DOCUMENT SEARCH AND RETRIEVAL APPARATUS, RECORDING MEDIUM AND PROGRAM

BACKGROUND OF THE INVENTION

1. Field of the Invention

The present invention relates to a search apparatus for searching for a keyword from a character recognition result obtained as a result of recognition of characters in an original document using an index table, a program for causing the search apparatus to execute search processing, and a recording medium for having the program stored thereon.

2. Description of the Related Art

Recently, as the use of Internet has widely spread, a search technology for searching for necessary information from a huge amount of information existing on a network has become a target of attention as an important technology. Especially, many systems for searching for a specific keyword from text data have already been provided. Such search systems are required to be capable of performing an accurate and high-speed search of a huge amount of text documents.

A technology of searching for a specific keyword from text data using an index table in order to perform a high-speed search operation is known. The index table defines an index character string including a prescribed number of characters (for example, two characters) and a position, of a portion in the text data, which corresponds to the position of the index character string.

For searching for a keyword from an assembly of character codes (character recognition result) which is obtained as a result of recognition of characters in an original document (e.g., a document in the form of paper), it is necessary to consider an error in the recognition of the characters (erroneous recognition). The reason for this is when an error occurs in the recognition of characters, the character represented by a character code can be different from the character actually written in the original document. The "erroneous recognition" refers to when the character written in the original document is not correctly converted into a character code. The erroneous recognition is caused for example, by the character printed on a sheet of paper being faint or inclined or by the sheet of paper being stained.

For example, where an original document includes a character string "イヌ" at a certain position thereof and the character "ヌ" in the character string is erroneously recognized as "ス" the character recognition result includes a character string "イス" at a position of a portion thereof corresponding to the position of the character string "イヌ" As a result, an index table which is prepared from the character recognition result has an index character string "イス" and the position thereof registered thereto. Accordingly, a search operation for a keyword "イヌ" using this index table does not result in the keyword being detected at that position in the character recognition result. Thus, the state in which although there is a keyword at a certain position in the original document, the keyword cannot be detected at that position, i.e., a "search omission" occurs.

According to one known technology for solving the problem of "search omission", a plurality of candidate characters are prepared as a character recognition result for one character in an original document, and a plurality of character strings having a possibility of existing in the original document based on the plurality of candidate characters are registered in an index table. A search operation for a keyword is performed using this index table. Such a technology is disclosed in, for example, Japanese Laid-Open Publication No. 9-16619 entitled "Method and Device for Processing Information".

FIG. 11 shows an example of an index table 1901 which is prepared according to the above conventional method. The index table 1901 has a plurality of character strings having a possibility of existing in an original document registered as index character strings. In the example shown in FIG. 11, the index table 1901 is obtained as a result of the recognition of characters in an original document which includes a character string "インデックスを用いた". In the index table 1901, an index character string "イシ" and an index character string "イン" are both registered as existing at a character position "1" (row 1911 and row 1912) in the character recognition result.

Using the index table 1901 shown in FIG. 11, the keyword "インデックス" can be detected. Hereinafter, processing for searching for the keyword "インデックス" using the index table 1901 according to the conventional method will be described.

First, character strings of two adjacent characters included in the keyword are generated. From the keyword "インデックス" five character strings "イン", "ンデ", "デッ", "ック" and "クス" are generated.

Then, these character strings are retrieved from the index table 1901. The character strings "イン", "ンデ", "デッ", "ック" and "クス" are respectively shown as existing at character positions "1", "2", "3", "4" and "5" (rows 1912, 1919, 1915, 1914 and 1913).

From the positional relationship among these character positions, it is determined that the keyword "インデックス" is included in the character recognition result.

Such a conventional method of using an index table having a plurality of character strings having a possibility of existing in an original document registered as index character strings solves the problem of search omission.

However, the above-describe conventional method has a problem in that search noise is increased. "Search noise" refers to a keyword being detected despite the keyword not being included in the original document. For example, when the index table 1901 shown in FIG. 11 is used to search for the keywords "デンワ" and "フック", these keywords are detected at a character position "3". In order to determine whether the search result is correct or not, the user needs to compare the search result with the original document.

As the number of candidate characters which are prepared as a character recognition result for one character is increased in order to prevent the problem of search omission, such search noise occurs more often. As a result, the burden placed on the user to determine whether the search result is correct or not is increased.

SUMMARY OF THE INVENTION

According to one aspect of the invention, a search apparatus for searching for a keyword from a character recognition result using an index table is provided. The character recognition result is obtained as a result of character recognition of characters in an original document. The index table includes an index character string; a position of a portion, in the character recognition result, which matches the index character string; and a credibility which is defined for each character included in the index character string and indicates a probability of the character existing in a portion, in the original document, which corresponds to a portion, in the character recognition result, which matches the character. The search apparatus includes a position specifying section for determining whether or not the keyword matches a portion in the character recognition result based on the index character string and the position of the portion in the character recognition result which matches the index character string included in the index table; and when a match is determined, for specifying the position of the portion in the character recognition result which matches the keyword; and a calculation section for calculating a keyword credibility which indicates a probability of the keyword existing at a position, in the original document, which corresponds to the position of the portion in the character recognition result which matches the keyword, based on the credibility included in the index table.

In one embodiment of the invention, the search apparatus further includes a determination section for determining a degree of correctness of a search result based on the keyword credibility.

In one embodiment of the invention, the determination section determines that the search result is correct when the keyword credibility is equal to or greater than a prescribed value.

In one embodiment of the invention, the prescribed value is set in accordance with at least one of a type of the characters included in the keyword and a number of characters included in the keyword.

In one embodiment of the invention, the search apparatus further includes an index table preparation section for preparing an index table. The character recognition result includes a plurality of portions respectively corresponding to the characters in the original document. Each portion of the plurality of portions includes at least one character. The index table preparation section generates the index character string by combining the at least one character included in each of a plurality of continuous portions among the plurality of portions included in the character recognition result.

In one embodiment of the invention, the search apparatus further includes an index table preparation section for preparing an index table. The character recognition result includes a plurality of portions respectively corresponding to the characters in the original document. Each portion of the plurality of portions includes a character. The index table preparation section generates the index character string by combining at least one character pre-associated with the character included in each of a plurality of continuous portions among the plurality of portions included in the character recognition result.

According to another aspect of the invention, a computer-readable recording medium having, stored thereon, a program for causing a computer to execute search processing for searching for a keyword from a character recognition result using an index table is provided. The character recognition result is obtained as a result of character recognition of characters in an original document. The index table includes an index character string; a position of a portion, in the character recognition result, which matches the index character string; and a credibility which is defined for each character included in the index character string and indicates a probability of the character existing in a portion, in the original document, which corresponds to a portion, in the character recognition result, which matches the character. The search processing includes the steps of determining whether or not the keyword matches a portion in the character recognition result based on the index character string included in the index table and the position of the portion, in the character recognition result, which matches the index character string; and when a match is determined, specifying the position of the portion in the character recognition result which matches the keyword; and calculating a keyword credibility which indicates a probability of the keyword existing at a position, in the original document, which corresponds to the position of the portion in the character recognition result which matches the keyword, based on the credibility included in the index table.

According to still another aspect of the invention, a program for causing a computer to execute search processing for searching for a keyword from a character recognition result using an index table is provided. The character recognition result is obtained as a result of character recognition of characters in an original document. The index table includes an index character string; a position of a portion, in the character recognition result, which matches the index character string; and a credibility which is defined for each character included in the index character string and indicates a probability of the character existing in a portion, in the original document, which corresponds to a portion, in the character recognition result, which matches the character. The search processing includes the steps of determining whether or not the keyword matches a portion in the character recognition result based on the index character string included in the index table and the position of the portion, in the character recognition result, which matches the index character string; and when a match is determined, specifying the position of the portion in the character recognition result which matches the keyword; and calculating a keyword credibility which indicates a probability of the keyword existing at a position, in the original document, which corresponds to the position of the portion in the character recognition result which matches the keyword, based on the credibility included in the index table.

Thus, the invention described herein makes possible the advantages of providing a search apparatus for performing a high-speed search and determining whether a search result is correct or not, a program for causing the search apparatus to execute search processing, and a recording medium having the program stored thereon.

These and other advantages of the present invention will become apparent to those skilled in the art upon reading and understanding the following detailed description with reference to the accompanying figures.

BRIEF DESCRIPTION OF THE DRAWINGS

FIG. 4 shows an example of a character recognition result 140 obtained as a result of character recognition processing performed on the original document 1310;

FIG. 5B shows an example of a candidate character-credibility table 1501;

FIG. 6 shows an example of an index table 190 prepared by the index table preparation processing:

FIG. 7 shows an example of a character recognition result 140a which shows one candidate character for one character position;

FIG. 8A is a flowchart illustrating a procedure of index table preparation processing of preparing an index table from the character recognition result 140a;

FIG. 8B shows an example of a similar character-credibility table 1801;

FIG. 9 shows an example of a credibility table 150;

FIG. 11 shows an example of an index table 1901 in which a plurality of character strings having a possibility of existing in an original document as index character strings are registered.

DESCRIPTION OF THE PREFERRED EMBODIMENTS

Hereinafter, the present invention will be described by way of illustrative examples with reference to the accompanying drawings.

Throughout this specification, the term "character" is not limited to a character used in any specific language, but is defined to include a numerical character and various symbols (for example, ")" or "☺"). These characters each have a code (character code) for electronically representing the character assigned thereto.

Figure 1:
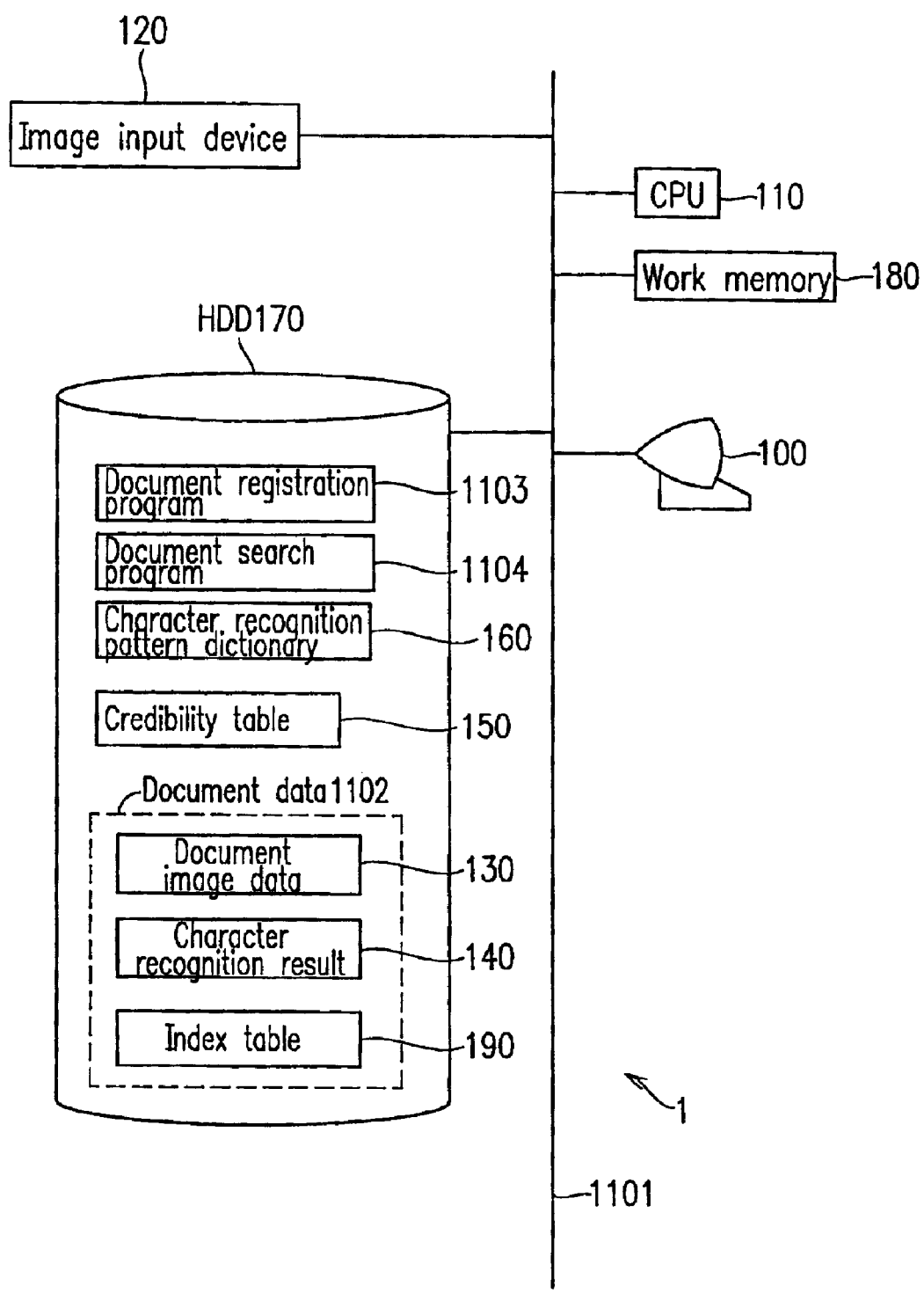
FIG. 1 is a block diagram illustrating a structure of a search apparatus 1 according to the present invention.

FIG. 1 shows a structure of a search apparatus 1 according to one example of the present invention. The search apparatus 1 searches for a keyword from a character recognition result which is obtained as a result of recognition of characters in an original document.

The search apparatus 1 includes a terminal 100, a CPU 110 for executing document registration processing and document search processing, an image input device 120 for receiving an original document and generating image data from the original document, a work memory 180, and a hard disk drive (HDD) 170. These elements are connected to one another through an internal bus 1101. These elements may be connected to one another through any type of network.

The terminal 100 is, for example, an input/output device including a keyboard and a CRT. The terminal 100, for example, is used for allowing the user to specify the processing to be executed by the search apparatus 1 or displaying the search result obtained by the search apparatus 1 to the user.

The HDD 170 has a document registration program 1103, a document search program 1104, a character recognition pattern dictionary 160, a credibility table 150, and document data 1102 stored on the HDD 170. As the HDD 170, any type of memory is usable.

The document registration program 1103 and the document search program 1104 may be entirely or partially provided to the search apparatus 1 through any type of communication line (not shown) or broadcast, or may be entirely or partially provided to the search apparatus 1 in the form of being stored on any type of computer readable recording medium. The recording medium is, for example, a DVD-ROM, a CD-ROM, or a flexible disk. The document registration program 1103 and the document search program 1104 stored on such a recording medium are installed in the search apparatus 1 by a reading device such as, for example, a disk drive.

Figure 2:
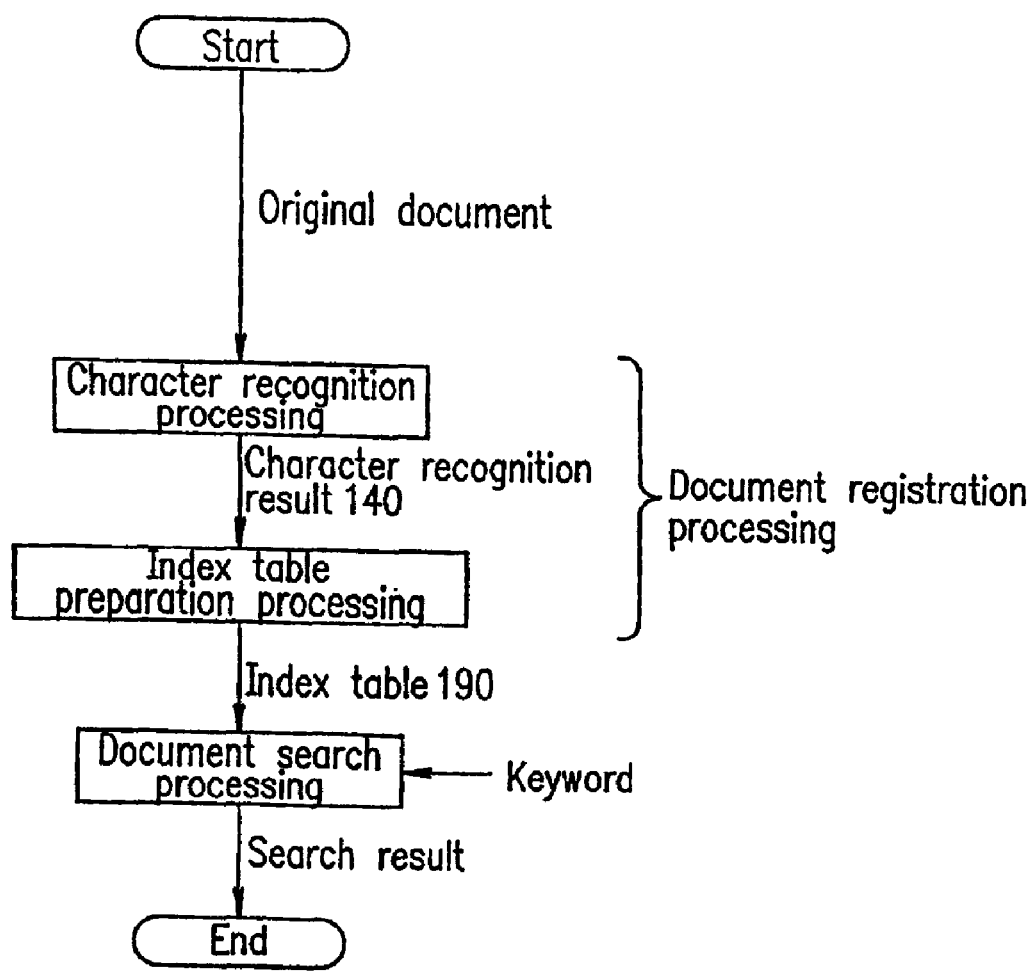
FIG. 2 shows a flow of processing performed by the search apparatus 1 in order to search for a keyword from a character recognition result obtained as a result of character recognition processing of characters in an original document.

FIG. 2 shows a flow of processing which is executed by the search apparatus 1 in order to search for a keyword from a character recognition result obtained by recognition of characters in an original document.

When a user instructs the start of document registration processing via the terminal 100 (FIG. 1), the document registration program 1103 stored on the HDD 170 is loaded on the work memory 180. The CPU 110 can access the work memory 180 at high speed. The document registration processing is performed by the CPU 110 executing the document registration program 1103.

The document registration processing includes character recognition processing and index table preparation processing. The character recognition processing is performed by the CPU 110 executing a character recognition program (not shown), which is a part of the document registration program 1103. The index table preparation processing is performed by the CPU 110 executing an index table preparation program, which is also a part of the document registration program 1103.

In the character recognition processing, the image input device 120 (FIG. 1) reads the original document and generates image data of the original document (document image data) 130. The document image data 130 is stored on the HDD 170 (FIG. 1). The character recognition processing is performed based on the similarity between a shape represented by a partial area in the document image data 130 and a shape of each of characters registered in the character recognition pattern dictionary 160 (FIG. 1). The result of the character recognition processing is stored on the HDD 170 as a character recognition result 140.

In the index table preparation processing, an index table 190 is prepared from the character recognition result 140. The index table 190 is stored on the HDD 170. In the index table preparation processing, the credibility table 150 (FIG. 1) is referred to.

As shown in FIG. 1, the document image data 130, the character recognition result 140 and the index table 190 stored on the HDD 170 are included in the document data 1102.

When the user inputs a keyword via the terminal 100 to instruct the start of the document search processing, the document search program 1104 stored on the HDD 170 is loaded on the work memory 180. The document search processing is performed by the CPU 110 executing the document search program 1104. In the document search processing, the keyword is retrieved from the character recognition result using the index table 190.

Once the index table 190 is prepared by the document registration processing, the keyword is searched for with reference to the index table 190. Even when a different keyword is to be searched for, it is not necessary to prepare a different index table.

It is not necessary that all the processing shown in FIG. 2 is performed by the search apparatus 1. For example, the document registration processing may be performed by a different device from the search apparatus 1 with the document search processing using the index table 190 being performed by the search apparatus 1.

Figure 3:
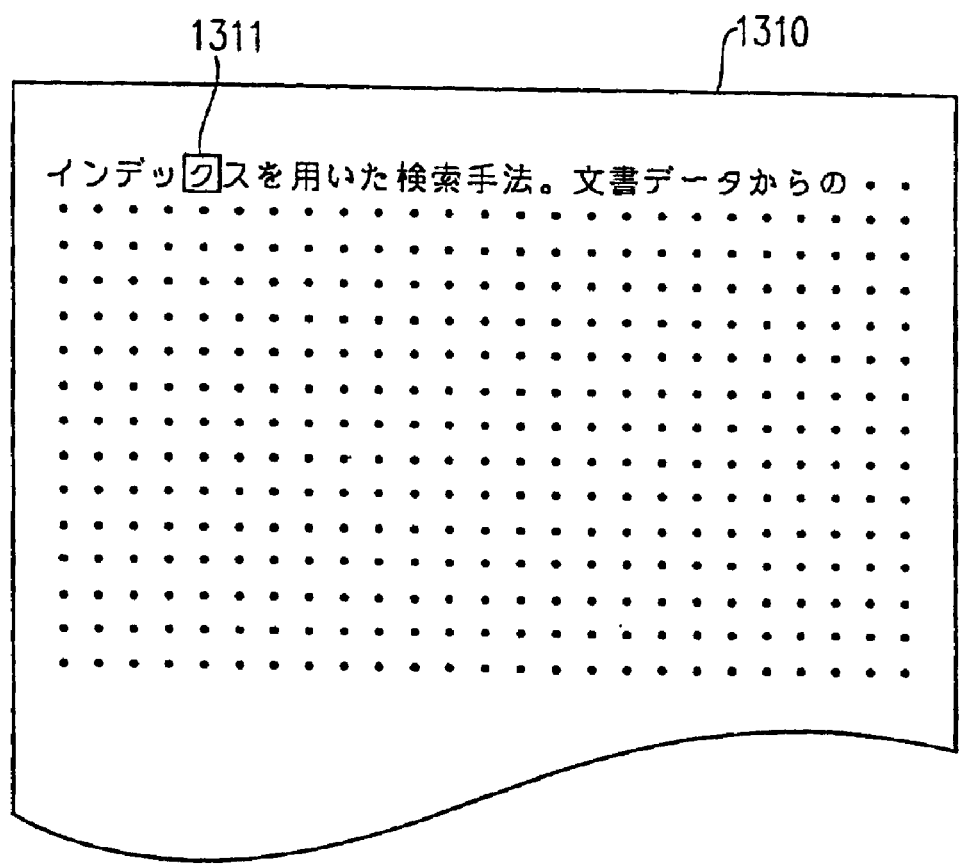
FIG. 3 shows an example of an original document 1310.

FIG. 3 shows an example of an original document 1310. The original document 1310 has a character string "インデックスを用いた検索手法。文書データからの". An "original document" is, for example, a document in the form of paper including a character string printed thereon. An original document may be, for example, a sign, or a phrase or sentence written on a signboard or a bulletin board.

FIG. 4 shows an example of the character recognition result 140 obtained as a result of character recognition processing performed on the original document 1310. The character recognition result 140 shows character positions in row 1042 and candidate characters in row 1043. In FIG. 4, the numerical value shown in the parenthesis following each candidate character represents the reliability Rr of each candidate character. According to the character recognition result 140, candidate characters recognized as characters "イ", "ン", "テ", "ツ", "ク", and "ス" included in the original document 1310 (FIG. 3) with the highest reliability Rr are "イ", "ツ", "テ", "ン", "タ" and "ス", respectively.

The character recognition processing may be performed in accordance with any algorithm. According to one exemplary algorithm, the document image data 130 is cut on a character-by-character basis, and the cut-out portions of the document image data 130 each of which corresponds to one character (i.e., partial areas) are converted into character codes, respectively.

For converting a partial area into a character code, the shape of the partial area and the shape of each of the characters registered in the character recognition pattern dictionary 160 (FIG. 1) are compared to each other. Among the characters registered in the character recognition pattern dictionary 160, a character which is determined to be similar in shape to the partial area based on prescribed determination criteria is obtained as a candidate character. In this manner, a plurality of partial areas are converted into character codes of the candidate characters, respectively. A plurality of candidate characters may be obtained for one partial area.

A candidate character or characters are similar in shape to the partial area and thus can be considered to match the character written in the partial area in the original document with high possibility.

Each of the columns (for example, column 1044) in the character recognition result 140 corresponds to a partial area in the document image data 130 and corresponds to a portion of the original document 1310 (for example, a portion 1311 in FIG. 3). Since the document image data 130 is cut on a character-by-character basis, each partial area corresponds to one character in the original document 1310 (i.e., a character "ク" written in a portion 1311 in FIG. 3).

Candidate characters "タ", "ウ", "ワ" and "ク" in a column 1044 can be considered to match the character in the portion 1311 in the original document 1310 (FIG. 3) with high possibility.

Each character position (in row 1042) shows the position of the respective candidate character or characters in the character recognition result 140. For example, a character position "5" in the column 1044 shows that the column 1044 (a portion in the character recognition table) is at the "fifth" (5) position in the character recognition result 140.

The character position (in row 1042) may be represented in any manner so long as the portion in the original document 1310 corresponding to each candidate character can be specified. As described above, each column in the character recognition result 140 corresponds to the respective partial area in the document image data 130. Accordingly, each character position (in row 1042) may be represented by the position, in the character recognition result 140, of the column including the candidate character, or may be represented by the position, in the document image data 130, of the partial area corresponding to the column.

More specifically, each character position (in row 1042) may be represented by the document name of the original document 1310, the page number, the line number, and the position on that line (e.g., 1st character, 2nd character, etc.), or may be represented by the coordinate or address in the document image data 130.

The reliability Rr represents the probability of the character recognition, i.e., the probability of the candidate character being correct. The reliability Rr is a value between 0 and 1 inclusive. With a higher value, the probability is higher. The character recognition may be performed using, for example, a neural network, vector quantization, or template matching.

When a neural network is used for the character recognition, a character corresponding to at least one neuron having an output value which is equal to or greater than a prescribed reference value is obtained as a candidate character among the characters registered in the character recognition pattern dictionary 160. First, the correlation between the output values of neurons and the possibility of the candidate characters being correct is found. Then, the reliability Rr can be found from the output value of the neuron corresponding to each candidate character based on the correlation.

According to vector quantization and template matching, the character recognition is performed by finding the distance in a feature space between the shape of the partial area in the document image data 130 and the shape of each character registered in the character recognition pattern dictionary 160. One shape is represented as one representative point in the feature space. When vector quantization or template matching is used for the character recognition, at least one character having a distance which is equal to or less than a prescribed reference value is obtained as a candidate character among the characters registered in the character recognition pattern dictionary 160. First, the correlation between the distance in the feature space and the possibility of the candidate characters being correct is found. Then, the reliability Rr can be found from the distance in the feature space corresponding to each candidate character based on the correlation.

Whichever technique is used, the reliability Rr reflects the similarity between the shape of the partial area in the document image data 130 and the shape of each character registered in the character recognition pattern dictionary 160.

In order to find the reliability Rr, information other than the similarity in shape can be taken into consideration. For example, a deviation SR of the size of the partial area, in the document image data 130, which is the target of character recognition, or a deviation LR of the relative position of the partial area on a specific line may be considered.

The deviation SR of the size of the partial area can be defined, for example, as a deviation of the size of the partial area from the average value of the sizes of all the partial areas (each partial area corresponding to one character) in the document image data 130. By finding the correlation between the deviation SR and the possibility of the candidate character being correct beforehand, the reliability Rr can be modified so that the reliability Rr is smaller when the deviation SR is larger.

The deviation LR of the relative position of the partial area is defined as follows. The average value of the positions of all the partial areas (each corresponding to one character) in one line in the document image data 130, the position being in a direction vertical to the line, and the deviation of the specific partial area from the average value is obtained as the deviation LR. By finding the correlation between the deviation LR and the possibility of the candidate character being correct beforehand, the reliability Rr can be modified so that the reliability Rr is smaller when the deviation LR is larger.

The reliability Rr can be more appropriately set by modifying the reliability Rr in accordance with the deviation SR and/or the deviation LR.

As described above, the index table 190 is prepared from the character recognition result 140 (index table preparation processing).

Figure 5A:
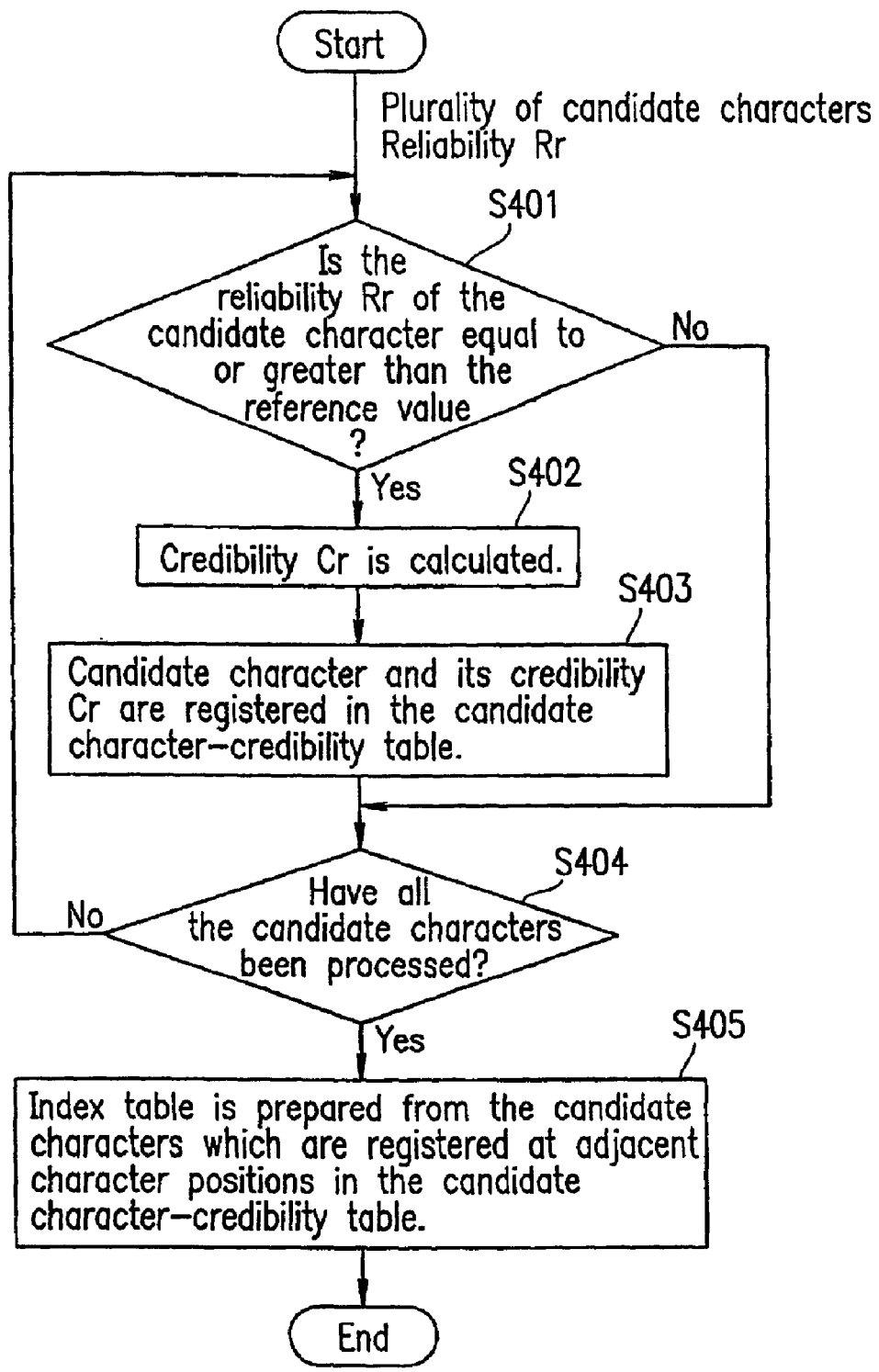
FIG. 5A is a flowchart illustrating a procedure of index table preparation processing of preparing an index table from the character recognition result 140.

FIG. 5A is a flowchart for illustrating index table preparation processing.

Step S401: It is determined whether or not a candidate character of interest in the character recognition result 140 has a reliability Rr which is equal to or greater than a reference value. The reference value may be, for example, 0.05. When it is determined that the candidate character of interest in the character recognition result 140 has a reliability Rr which is equal to or greater than a reference value ("Yes" in step S401), the processing goes to step S402. When it is determined that the candidate character of interest in the character recognition result 140 does not have a reliability Rr which is equal to or greater than the reference value ("No" in step S401), the processing goes to step S404.

When obtaining the character recognition result 140 (FIG. 4) by character recognition processing, only the candidate characters having a reliability Rr which is equal to or greater than the reference value may be included in the character recognition result 140. In this case, step S401 may be skipped.

Step S402: The credibility Cr of the candidate character is calculated. The calculation of the credibility Cr is, for example, based on the reliability Rr of each candidate character using expression (1).

$$\text{Credibility } Cr = (\text{Reliability } Rr \text{ of the candidate character}) \times (\text{coefficient } Kr \text{ of the character}) \quad (1)$$

The coefficient Kr of a certain character depends on an appearance probability, i.e., the probability at which the character appears in a usual document. Different types of characters have different levels of appearance probability in a usual document. For example, in a typical Japanese document, the appearance probability of a character "ゐ" is lower than the appearance probability of a character "る". For a character having a lower appearance probability, the coefficient Kr is set to be lower. By contrast, for a character having a higher appearance probability, the coefficient Kr is set to be higher. The appearance probability of each character can be statistically obtained based on a sufficient amount of typical documents.

The credibility Cr of each candidate character is obtained by multiplying the reliability Rr of the candidate character by the coefficient Kr of the same character as the candidate character (character having an identical character code with that of the candidate character) as shown in expression (1). The credibility Cr thus obtained indicates the probability at which the same character as the candidate character exists in a specific portion in the original document. The specific portion is the portion in the original document which corresponds to the column including the candidate character (portion in the character recognition result 140 in FIG. 4).

It should be noted that the credibility Cr need not be the probability in the sense of statistics. The credibility Cr may be a value obtained by normalizing the probability in the sense of statistics in accordance with a prescribed criterion. Such a prescribed criterion may be any criterion so long as the credibility Cr of the candidate character indicates the probability at which the same character as the candidate character exists in a specific portion in the original document. The credibility Cr may be represented as an integer instead of as a real number. Alternatively, the credibility Cr may be represented as a symbol showing its level stepwise (for example, ○=high; △=medium; χ=low).

In the case where the appearance probability of each character is not known, the coefficients of all the characters may be set to be the same. Alternatively, the coefficient may be set for each type of character (for example, Chinese characters, and "katakana" and "hiragana", which are two systems of phonetic characters).

Step S403: The candidate character and its credibility Cr obtained in step S402 are registered in a candidate character-credibility table.

FIG. 5B shows an example of a candidate character-credibility table 1501. The candidate character at each character position (in row 1042 of FIG. 4) and its credibility Cr are registered in the candidate character-credibility table 1501.

Returning to FIG. 5A, the index table preparation processing will be described.

Step S404: It is determined whether or not processing in steps S401 through S403 has been performed on all the candidate characters at all the character positions. When it is determined such processing has been performed on all the candidate characters at all the positions ("Yes" in step S404), the processing advances to step S405. When it is determined that such processing has not been performed on all the candidate characters at all the positions ("No" in step S404), the processing in step S401 through S403 is performed on the candidate character or characters on which such processing has not been performed.

Step S405: An index table (described below) is prepared from the candidate characters registered at adjacent positions in the candidate character-credibility table 1501 (FIG. 5B). The index table defines the index character strings, the character positions, and the levels of credibility Cr.

Each index character string is generated by combining candidate characters registered at adjacent character positions in the candidate character-credibility table 1501 (FIG. 5B). For example, an index character string "イシ" is generated by combining a candidate character "イ" registered at a character position "1" in the candidate character-credibility table 1501 and the candidate character "ツ" registered at a character position "2" adjacent to the character position "1".

FIG. 6 shows an example of the index table 190 prepared by the index table preparation processing. A column 1610 indicates the index character strings. A column 1611 indicates a character position of the leading candidate character of each index character string, and a column 1612 indicates a credibility Cr set defined for each candidate character included in the index character string.

Row 1602 of the index table 190 shows that the position of the portion in the character recognition result 140 matching the index character string "イシ" is "1", the credibility Cr defined on character "イ" of the index character string "イシ" is 0.9, and the credibility Cr defined on character "ツ" of the index character string "イシ" is 0.8, shown as set (0.9, 0.8).

The credibility Cr set defined for each of the candidate characters included in the index character string "イシ" is obtained as the credibility Cr set calculated in step S402 (FIG. 5A) for each candidate character. As the credibility Cr set, a value obtained by multiplying the credibility Cr calculated in step S402 (FIG. 5A) by the coefficient of each index character string may be used. The coefficient is, for example, set to be lower for an index character string having a lower probability of appearing in a typical document. For example, character strings "ヲヲ" and "ｦｦ" have a low probability of appearing in a typical Japanese document. For such an index character string, the coefficient may be set lower.

Generation of an index character string by combining candidate characters registered at adjacent character positions in the candidate character-credibility table 1501 (FIG. 5B) is equivalent to combining candidate characters included in a plurality of adjacent (continuous) columns in the character recognition result 140 (FIG. 4) (for example, columns 1045 and 1046) among the plurality of columns shown in the character recognition result 140.

Thus, in steps S401 through S405 (FIG. 5A), the CPU 110 (FIG. 1) acts as an index table preparation section for preparing the index table 190.

The index table 190 is prepared by registering all the combinations of the candidate characters registered at adjacent character positions in the candidate character-credibility table 1501 shown in FIG. 5B.

In the case where all the combinations of such candidate characters includes an identical combination or combinations, the index table 190 includes a plurality of character positions and a plurality of credibility Cr sets for each index character string. For example, an index character string "ンワ" is generated from the candidate characters "ン" and "ワ" registered at character positions "2" and "3" of the candidate character-credibility table 1501, and the index character string "ンワ" is also generated from the candidate characters "ン" and "ワ" registered at character positions "4" and "5" of the candidate character-credibility table 1501. In this case, a character position "2" and a credibility Cr set (0.7, 0.2) and a character position "4" and a credibility Cr set (0.1, 0.2) are registered in the index table 190 for one index character string "ンワ" (row 1604).

The number of characters included in an index character string is predetermined. In the example shown in FIG. 6, the number of characters included in an index character string is two. The number of characters may be any natural number, but is preferably two or more in general. The reason for this is when the number of characters is one, the number of character positions and the number of the levels of credibility Cr registered for each index character string are increased, which prevents a high-speed search operation.

The index character strings in the index table 190 are preferably in a prescribed order in order to facilitate the search operation.

The index table 190 is prepared using a plurality of candidate characters for a character position in the character recognition result 140 in FIG. 4. As a result, the index table 190 includes a plurality of index character strings corresponding to the same character position. Accordingly, the plurality of index character strings can match the same portion of the character recognition result. For example, the index character string "イシ" in row 1602 of the index table 190 and the index character string "イン" in row 1603 both match one portion in the character recognition result 140 (a portion including columns 1045 and 1046). In this manner, search omission can be reduced.

The expression that an index character string matches a portion of the character recognition result indicates the concept that each character included in the index character string is identical to (i.e., has the same character code as) at least one candidate character included in one of continuous portions of the character recognition result.

An index table including a plurality of index character strings corresponding to a character position (such as the index table 190) may also be prepared from a character recognition result in which one candidate character corresponds to one character position.

FIG. 7 shows an example of such a character recognition result 140a. Unlike the character recognition result 140, the character recognition result 140a includes one candidate character corresponding to one character position. The character recognition result 140a shows that the characters "イ", "ン", "デ", "ツ", "ク", and "ス", included in the original document 1310 (FIG. 3) are respectively recognized as "イ", "ツ", "デ", "ン", "タ", and "ス". Thus, characters "ン", "デ", "ツ", and "ク" are incorrectly recognized.

FIG. 8A is a flowchart illustrating processing for preparing an index table from the character recognition result 140a shown in FIG. 7 (index table preparation processing).

Step S501: Referring to the credibility table 150 (FIG. 1), a similar character and credibility Cr set is obtained from one candidate character and reliability Rr set corresponding to one character position. A plurality of similar character and credibility Cr sets may be obtained. This processing is performed on each character position. The credibility table 150 will be described later with reference to FIG. 9.

Step S502: It is determined whether or not the credibility Cr of the similar character is equal to or greater than a prescribed reference value. The prescribed reference value is, for example, 0.05. When it is determined that the credibility Cr of the similar character is equal to or greater than the prescribed reference value ("Yes" in step S502), the processing advances to step S503. When it is determined that the credibility Cr of the similar character is not equal to or greater than the prescribed reference value ("No" in step S502), the processing advances to step S504.

Step S503: The similar character and the credibility Cr obtained in step S501 are registered in a similar character-credibility table.

FIG. 8B shows an example of a similar character-credibility table 1801. The similar character and the credibility are registered in the similar character-credibility table 1801 for each character position in row 1042 of FIG. 7.

Returning to FIG. 8A, the index table preparation processing will be described.

Step S504: It is determined whether or not processing in steps S502 and S503 has been performed on the candidate characters at all of the character positions. When it is determined such processing has been performed on the candidate characters at all of the positions ("Yes" in step S504), the processing advances to step S505. When it is determined that such processing has not been performed on the candidate characters at all the positions ("No" in step S504), the processing in step S502 and S503 is performed on the candidate character or characters on which such processing has not been performed.

Step S505: An index table is prepared from the similar characters registered at adjacent positions in the similar character-credibility table 1801 (FIG. 8B). Each index character string is generated by combining similar characters registered at adjacent character positions in the similar character-credibility table 1801 (FIG. 8B). This processing is similar to the processing of preparing the index table 190

(FIG. 6) from the candidate character-credibility table 1501 (FIG. 5B) in step S405 shown in FIG. 5A.

The resultant index table is similar to the index table 190 shown in FIG. 6. For example, in row 1602, the column 1611 indicates the character position of the leading similar character "イ" of the index character string "イシ". The column 1612 indicates the credibility Cr set (0.9, 0.8) defined for each similar character included in the index character string "イシ".

FIG. 9 shows an example of the credibility table 150. More specifically, FIG. 9 shows a portion regarding a candidate character "ツ" in the credibility table 150.

The credibility table 150 shows that when, for example, one candidate character "ツ" and its reliability Rr of "0.9" are obtained as the character recognition result, a similar character "ン" and its credibility Cr of "0.2" and a similar character "ツ" and its credibility Cr of "0.8" are obtained. The similar characters "ン" and "ツ" are similar in shape or identical to the candidate character "ツ".

The similar characters "ン" and "ツ" are obtained for the candidate character "ツ". This indicates that when the candidate character "ツ" is obtained as the character recognition result, there is a high possibility that the similar character "ン" or "ツ" is written in the original document.

The credibility table 150 is prepared by first performing character recognition on the original document having many types of many characters written therein, and then comparing the resultant character recognition result and the reliability Rr with the characters actually existing in the original document. For example, the credibility Cr of "0.2" shown in data area 1811 of the credibility table 150 can be obtained from the probability at which the candidate character "ツ" and the reliability Rr of 0.9 are obtained when character recognition is performed on character "ン" written in various fonts or at various printing qualities.

The credibility table 150 is prepared for all the combinations of the characters. Similar characters having a credibility Cr which is smaller than the prescribed reference value need not be registered in the credibility table 150. Therefore, the number of similar characters obtained for one candidate character can be limited.

When the reliability Rr obtained by character recognition does not match the reliability Rr defined in the credibility table 150 (for example, when the reliability Rr obtained by character recognition is 0.8), the credibility Cr is calculated by an appropriate method. For example, when the reliability Rr obtained by character recognition is smaller than 0.5, the row of the reliability Rr of 0.5 in the credibility table 150 may be referred to. When the reliability Rr obtained by character recognition is larger than 0.9, the row of the reliability Rr of 0.9 in the credibility table 150 may be referred to. When the reliability Rr obtained by character recognition is between two reliability Rr values defined in the credibility table 150, the row of the reliability Rr closer to the reliability Rr obtained by character recognition may be referred to.

The structure of the credibility table 150 is not limited to the structure shown in FIG. 9. The credibility table 150 may have any structure which allows at least one similar character and credibility Cr set to be obtained from a candidate character and reliability Rr set. For example, the credibility table 150 may be prepared as follows. Assuming that the credibility Cr is a linear function of the reliability Rr, an upper limit and a lower limit of a range of values which the credibility Cr can take, and an upper limit and a lower limit of a range of values which the reliability Rr can take, are defined in the credibility table 150. Alternatively, assuming the credibility Cr has a Gaussian distribution with respect to the reliability Rr, a mean value of the distribution and a variance may be defined in the credibility table 150.

By executing the index table preparation processing shown in FIG. 8A using the credibility table 150, the index table 190 (FIG. 6) including a plurality of index character strings for the same character position can be prepared even from the character recognition result 140a (FIG. 7) in which one candidate character corresponds to one character position.

The credibility table 150 may be omitted in the case where the search apparatus 1 (FIG. 1) executes the index table preparation processing in accordance with the procedure shown in FIG. 5A.

As described above, the index table 190 may be prepared using a plurality of similar characters which are pre-associated with one candidate character for a character position in the character recognition result 140a shown in FIG. 7. As a result, the index table 190 includes a plurality of index character strings corresponding to the same character position. Therefore, the plurality of index character strings can match the same portion of the character recognition result. In this manner, the occurrence of search omission can be reduced even when an incorrect character recognition occurs in the character recognition processing.

Each character included in an index character string is not necessarily identical with one candidate character included in continuous portions in the character recognition result (adjacent columns shown in FIG. 7). For example, the character "ン" included in the index character string "イン" shown in row 1603 of the index table 190 (FIG. 6) is not identical to the candidate character "ツ" included in a column 1046a of the character recognition result 140a (FIG. 7). However, the character "ン" included in the index character string "イン" is identical with the similar character "ン" which is pre-associated with the candidate character "ツ" by the credibility table 150 (FIG. 9).

The expression that an index character string matches a portion of the character recognition result indicates the concept that each character included in the index character string is identical to (i.e., has the same character code as) at least one candidate character which is pre-associated with one candidate character included in one of the continuous portions of the character recognition result.

Next, processing for searching for a keyword from the character recognition result using the index table 190 (FIG. 6) will be described.

Figure 10:
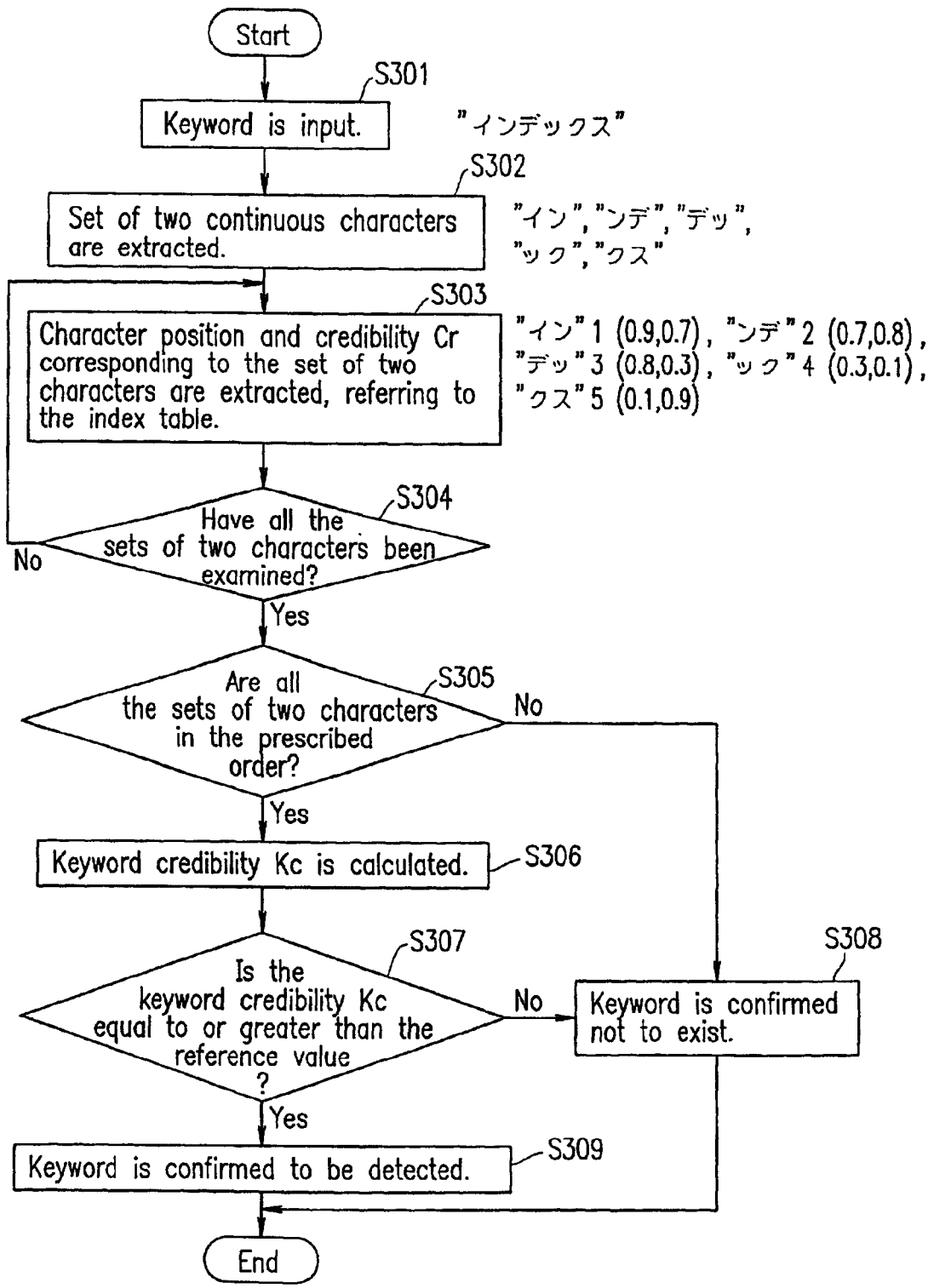
FIG. 10 is a flowchart illustrating a procedure of document search processing.

FIG. 10 is a flowchart illustrating a procedure of document search processing. Hereinafter, the procedure of document search processing will be described in detail.

Step S301: A keyword is input. In this example, the keyword is "インデックス".

Step S302: One or more sets of continuous two characters (a character string having a length of two) are extracted from the keyword. In this example, sets of two characters "イン", "ンデ", "デッ", "ック", and "クス" are extracted. The length of the character strings extracted is set to be equal to the index character strings defined in the index table. Accordingly, where the length of the index character strings is n (where n is a natural number), sets of n characters (character strings having a length of n) are extracted. In the following explanation, n=2.

The plurality of sets of two characters extracted have a portion overlapping each other. Alternatively, a plurality of sets of characters may be extracted from the keyword so that there is no overlapping portion. For example, sets of two characters "イン", "ンデ", and "クス" may be extracted from the keyword "インデックス". Each character included in the keyword should be included in at least one of the extracted sets of characters.

Step S303: Referring to the index table 190 (FIG. 6), character positions and the credibility Cr corresponding to each extracted set are obtained. In this example, the following character positions and the following credibility Cr sets are obtained.

| | |
|---|---|
| "イン": | character position "1"; credibility Cr set (0.9, 0.7) (row 1603) |
| "ンデ": | character position "2"; credibility Cr set (0.7, 0.8) (row 1605) |
| "デッ": | character position "3"; credibility Cr set (0.8, 0.3) (row 1606) |
| "ック": | character position "4"; credibility Cr set (0.3, 0.1) (row 1607) |
| "クス": | character position "5"; credibility Cr set (0.1, 0.9) (row 1608) |

In order to efficiently extract the character position and the credibility Cr corresponding to each set of characters from the index table 190 (FIG. 6), a table which shows the correspondence between character codes of the characters included in the index character string and the address at which the row including the index character string (for example, an address on the HDD 170) is stored may be used. Such an address may be obtained by a binary tree search.

Step S304: It is determined whether or not the processing of step S303 has been performed on all the sets of two characters. When it is determined that the processing of step S303 has been performed on all the sets of two characters ("Yes" in step S304), the processing advances to step S305. When it is determined that the processing of step S303 has not been performed on all the sets of two characters ("No" in step S304), the processing of step S303 is performed on the set or sets of two characters on which such processing has not been performed.

Step S305: It is determined whether or not all the sets of two characters are in a prescribed order. This determination is performed based on the character position obtained for each set of two characters in step S303. Specifically, when character position m (where m is a natural number) obtained for each of all the sets of two characters starting with a k'th character (where k is a natural number) fulfills the relationship of "m−k=constant", it is determined that all the sets of two characters are in a prescribed order.

When all the sets of two characters are in a prescribed order, that indicates that the keyword matches a specific portion of the character recognition result. The specific portion includes a portion, of the character recognition result, which matches each of the characters included in the keyword.

In this example, the keyword "インデックス" matches the portion 1047 in the character recognition result 140 (FIG. 4) or the portion 1047a in the character recognition result 140a (FIG. 7).

The position of the portion 1047 or the portion 1047a is specified as a character position "1", which is the position of the first column of the portion 1047 or the portion 1047a.

In this example, all the two characters extracted from the keyword "インデックス" fulfill the above-mentioned relationship. Therefore, it is determined that all the sets of two characters are in a prescribed order.

When it is determined that all the sets of two characters are in a prescribed order ("Yes" in step S305), the processing advances to step S306. When it is determined that all the sets of two characters are not in a prescribed order ("No" in step S305), the processing advances to step S308.

As described above, in steps S302 through S305, the CPU 110 (FIG. 1) determines whether or not the keyword matches a portion of the character recognition result based on the index character strings included in the index table 190 (FIG. 6) and respective positions of the portions in the character recognition result which match the index character strings. When the keyword matches a portion of the character recognition result, the CPU 110 specifies the position of that portion. Thus, the CPU 110 acts as a position specifying section.

Step S306: A keyword credibility Kc is calculated. The keyword credibility Kc is obtained as, for example, an arithmetic mean of the left value of the credibility Cr set corresponding to each of the sets of two characters extracted from the keyword "インデックス" (i.e., "イン", "ンデ", "デッ", "ック", and "クス") and the right value of the credibility Cr set corresponding to the last set of two characters of the keyword "インデックス" (i.e., "クス"). The arithmetic mean described above is equivalent to an arithmetic mean of the levels of credibility Cr respectively defined for the characters included in the keyword. In this example, the keyword credibility Kc=(0.9+0.7+0.8+0.3+0.1+0.9)/6=0.61.

The keyword credibility Kc may be calculated as a geometric mean, a median value, or a mode. Among values of each credibility Cr set corresponding to the respective set of two characters, only the value which is not smaller than the other value(s) may be used to obtain the keyword credibility Kc. When the credibility Cr is less than a prescribed reference value, using such a credibility Cr to calculate the keyword credibility Kc may be avoided.

As described above, the keyword credibility Kc is calculated based on the credibility Cr defined for each character included in the keyword.

The obtained keyword credibility Kc indicates the probability at which the keyword exists at the position, in the original document, which corresponds to the character position in the character recognition result.

For example, it is assumed that in step S305, the keyword "インデックス" is determined to match the portion 1047 in the character recognition result 140 (FIG. 4) or the portion 1047a in the character recognition result 140a (FIG. 7), and that the position of the portion 1047 or the portion 1047a is specified as a character position "1". In this case, the probability at which the keyword "インデックス" exists at the position, in the original document, corresponding to the character position "1" (i.e., the leading position of the original document) is 0.61.

In this manner, in step S306, the CPU 110 calculates the keyword credibility Kc which indicates the probability at which the keyword exists at the position, in the original document, corresponding to the position of the portion of the character recognition result which matches the keyword, based on the values of credibility Cr included in the index table 190. Thus, the CPU 110 acts as a calculation section.

Step S307: It is determined whether or not the keyword credibility Kc is equal to or greater than a reference value (prescribed value). The reference value may be, for example, 0.5. The reference value may be fixed or set in accordance with the keyword. For example, the reference value may be changed in accordance with the number of characters included in the keyword.

When the reference value is increased, search noise can be reduced, but when the reference value is too high, search omission occurs more easily. In general, when the number of characters included in the keyword is relatively large, it is preferable to set the reference value to be low so as to reduce the occurrence of search omission even when the possibility of incorrect character recognition is high. The reason for this is when the number of characters included in the keyword is relatively large, search noise is not increased much even when the reference value is set to be low.

The reference value may be changed in accordance with the type of characters included in the keyword. For example, a more efficient search operation can be performed by setting the reference value to be an optimum value in accordance with whether the keyword includes only "katakana", only "hiragana", only Chinese characters, "katakana" and a Chinese character, or the like.

Alternatively, the reference value can be designated by the user. The user can set an appropriate value in accordance with whether the purpose is to prevent search omission or to reduce search noise.

When it is determined that the keyword credibility Kc is equal to or greater than the prescribed reference value ("Yes" in step S307), the processing advances to step S309. When it is determined that the keyword credibility Kc is not equal to or greater than the prescribed reference value ("No" in step S307), the processing advances to step S308.

As described above, after a search result where the keyword matches a portion of the character recognition result 140 or a portion of the character recognition result 140a is obtained in step S305, the CPU 110 performs the processing of step S307 to determine whether or not the keyword exists in the actual original document (i.e., whether or not the search result is correct or not), based on the keyword credibility Kc. Thus, in step S307, CPU 110 acts as a determination section for determining a degree of correctness of the search result based on the keyword credibility Kc.

Step S308: It is confirmed that the keyword does not exist in the original document. A display of the terminal 100 (FIG. 1) shows a message of, for example, "the keyword is not found".

Step S309: It is confirmed that the keyword is detected. As the search result, the character position showing the position at which the keyword has been detected, and the keyword credibility Kc are obtained. When the keyword is detected at a plurality of positions, a plurality of character position and keyword credibility Kc sets are obtained.

In the above-described example in which the keyword is "インデックス", the character position "1" and a keyword credibility Kc of "0.61" are obtained.

The search result is displayed on, for example, a display of the terminal 100. The search apparatus 1, for example, displays the document image data 130 (and/or character recognition result 140, 140a) stored on the HDD 170 on a display of the terminal 100, and emphasizes an area of the document image data 130 (and/or character recognition result 140, 140a) corresponding to the keyword. The area is emphasized by displaying the characters in the area with a different attribute from that of other characters in the document image data 130 (and/or character recognition result 140, 140a), for example, color or brightness of the characters, color or brightness of the background, size of the characters, pitch of the characters, and font. Such an attribute may be changed in accordance with the keyword credibility Kc. For example, a range of the keyword credibility Kc from 0.5 to 1.0 inclusive may be divided into segments each having a width of 0.1, so that the attribute is changed from segment to segment. In this case, the user can visually grasp the degree of the keyword credibility Kc. Therefore, it is easier for the user to perform further visual determination on a correctness of the search result.

Alternatively, areas corresponding to the keyword may be displayed from the area having the highest keyword credibility Kc to the area having the lowest keyword credibility Kc.

When the user performs further visual determination on the correctness of the search result in this manner, the reference value used in step S307 may be set low.

Step S307 may be omitted. In this case, the determination on a correctness of the search result is performed totally by the user. Based on the keyword credibility Kc, the user can easily determine a correctness of the search result.

Hereinafter, an example of search noise being reduced by the document search processing shown in FIG. 10 will be described.

When the document search processing shown in FIG. 10 is performed on a keyword "ワックス" using the index table 190 shown in FIG. 6, the determination in step S305 is "Yes", and the character position "3" is specified.

In step S306, the keyword credibility Kc is calculated as follows: Kc=(0.2+0.3+0.1+0.9)/4=0.38.

Since the keyword credibility Kc is smaller than the reference value of 0.5, it is confirmed that the keyword does not exist in the original document.

When the document search processing is performed on a keyword "デンワ" in the same manner, the determination in step S305 is "Yes", and the character position "3" is specified.

In step S306, the keyword credibility Kc is calculated as follows: Kc=(0.8+0.1+0.2)/3=0.37.

Since the keyword credibility Kc is smaller than the reference value of 0.5, it is confirmed that no keyword exists in the original document.

When the document search processing is performed on a keyword "フック" in the same manner, the determination in step S305 is "Yes", and the character position "3" is specified.

In step S306, the keyword credibility Kc is calculated as follows: Kc=(0.2+0.3+0.1)/3=0.2.

Since the keyword credibility Kc is smaller than the reference value of 0.5, it is confirmed that no keyword exists in the original document.

In this manner, the search apparatus 1 according to the present invention can suppress a keyword from being detected despite no such keyword existing in the original document, i.e., the search apparatus 1 can suppress search noise.

The document search processing according to the present invention is not limited to be realized by software stored on a computer. The document search processing according to the present invention may be realized by hardware in a computer, or a combination of software and hardware.

In the above example, the present invention is described using Japanese language documents and characters. The present invention is not limited to Japanese language documents and characters, and is applicable to documents and characters of any language (for example, Chinese, English and Korean).

According to the present invention, keyword credibility Kc is calculated, based on a credibility Cr included in an index table. The keyword credibility Kc indicates a probability at which the keyword exists at the position, in an original document, which corresponds to a position of a portion, in a character recognition result, which in turn matches the keyword. Based on the keyword credibility Kc, a correctness of the search result can be determined.

The search apparatus according to the present invention uses an index table and therefore can perform a high-speed search operation.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A search apparatus for searching for a keyword from a character recognition result using an index table, the character recognition result being obtained as a result of character recognition of characters in an original document, wherein the index table includes an index character string; a position of a portion, in the character recognition result, which matches the index character string; and a credibility which is defined for each character included in the index character string and indicates a probability of the character existing in a portion, in the original document, which corresponds to a portion, in the character recognition result, which matches the character, the search apparatus comprising:

a position specifying section for determining whether or not the keyword matches a portion in the character recognition result based on the index character string and the position of the portion in the character recognition result which matches the index character string included in the index table; and when a match is determined, for specifying the position of the portion in the character recognition result which matches the keyword;

a calculation section for calculating a keyword credibility which indicates a probability of the keyword existing at a position, in the original document, which corresponds to the position of the portion in the character recognition result which matches the keyword, based on the credibility included in the index table.

a determination section for determining a degree of correctness of a search result based on the keyword credibility.

2. A search apparatus according to claim 1, further comprising a determination section for determining a degree of correctness of a search result based on the keyword credibility.

3. A search apparatus according to claim 1, wherein the determination section determines that the search result is correct when the keyword credibility is equal to or greater than a prescribed value.

4. A search apparatus according to claim 3, wherein the prescribed value is set in accordance with at least one of a type of the characters included in the keyword and a number of characters included in the keyword.

5. A search apparatus according to claim 1, further comprising an index table preparation section for preparing an index table, wherein:

the character recognition result includes a plurality of portions respectively corresponding to the characters in the original document, each portion of the plurality of portions includes a character, and the index table preparation section generates the index character string by combining at least one character pre-associated with the character included in each of a plurality of continuous portions among the plurality of portions included in the character recognition result.

6. A computer-readable recording medium having, stored thereon, a program for causing a computer to execute search processing for searching for a keyword from a character recognition result using an index table, the character recognition result being obtained as a result of character recognition of characters in an original document, wherein the index table includes an index character string; a position of a portion, in the character recognition result, which matches the index character string; and a credibility which is defined for each character included in the index character string and indicates a probability of the character existing in a portion, in the original document, which corresponds to a portion, in the character recognition result, which matches the character, the search processing comprising the steps of:

determining whether or not the keyword matches a portion in the character recognition result based on the index character string included in the index table and the position of the portion, in the character recognition result, which matches the index character string; and when a match is determined, specifying the position of the portion in the character recognition result which matches the keyword;

calculating a keyword credibility which indicates a probability of the keyword existing at a position, in the original document, which corresponds to the position of the portion in the character recognition result which matches the keyword, based on the credibility included in the index table; and determining a degree of correctness of a search result based on the keyword credibility.

7. A program for causing a computer to execute search processing for searching for a keyword from a character recognition result using an index table, the character recognition result being obtained as a result of character recognition of characters in an original document, wherein the index table includes an index character string; a position of a portion, in the character recognition result, which matches the index character string; and a credibility which is defined for each character included in the index character string and indicates a probability of the character existing in a portion, in the original document, which corresponds to a portion, in the character recognition result, which matches the character, the search processing comprising the steps of:

determining whether or not the keyword matches a portion in the character recognition result based on the index character string included in the index table and the position of the portion, in the character recognition result, which matches the index character string; and when a match is determined, specifying the position of the portion in the character recognition result which matches the keyword;

calculating a keyword credibility which indicates a probability of the keyword existing at a position, in the original document, which corresponds to the position of the portion in the character recognition result which matches the keyword, based on the credibility included in the index table; and determining a degree of correctness of a search result based on the keyword credibility.

* * * * *

UNITED STATES PATENT AND TRADEMARK OFFICE
CERTIFICATE OF CORRECTION

| | | |
|---|---|---|
| PATENT NO. | : 6,944,344 B2 | |
| APPLICATION NO. | : 09/875748 | |
| DATED | : September 13, 2005 | |
| INVENTOR(S) | : Taro Imagawa et al. | |

It is certified that error appears in the above-identified patent and that said Letters Patent is hereby corrected as shown below:

In claim 1, in column 19, beginning at line 38-43 should read:

--  a calculation section for calculating a keyword credibility which indicates a probability of the keyword existing at a position, in the original document, which corresponds to the position of the portion in the character recognition result which matches the keyword, based on the credibility included in the index table; and --

Claim 2, column 19, line 47 should read

--  A search apparatus according to claim 1, further comprising an index table preparation section for preparing an index table, wherein:
    the character recognition result includes a plurality of portions respectively corresponding to the characters in the original document,
    each portion of the plurality of portions includes at least one character, and
    the index table preparation section generates the index character string by combining the at least one character included in each of a plurality of continuous portions among the plurality of portions included in the character recognition result. --.

Signed and Sealed this

Thirtieth Day of October, 2007

JON W. DUDAS
*Director of the United States Patent and Trademark Office*